O. H. ESCHHOLZ.
ELECTRIC ARC WELDING SYSTEM.
APPLICATION FILED OCT. 6, 1919.
1,343,204.
Patented June 15, 1920.
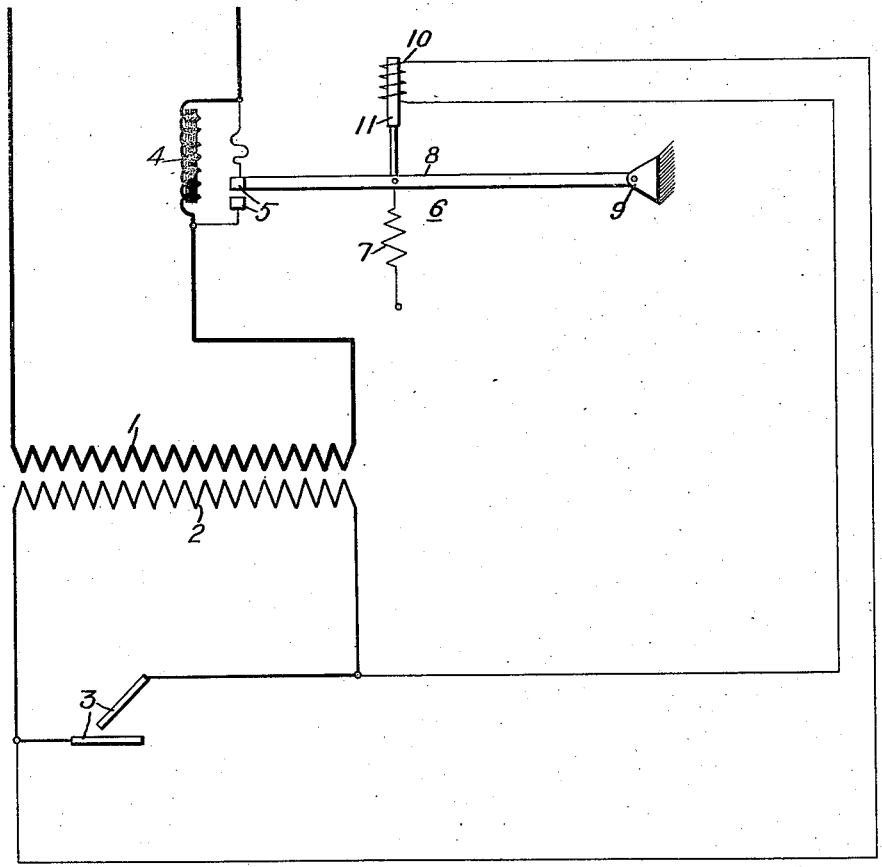
WITNESSES:
J. A. Helsel
O. E. Bee.
INVENTOR
Otto H. Eschholz
BY
Wesley G. Carr
ATTORNEY

UNITED STATES PATENT OFFICE.

OTTO H. ESCHHOLZ, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC-ARC-WELDING SYSTEM.

1,343,204.                Specification of Letters Patent.    Patented June 15, 1920.

Application filed October 6, 1919. Serial No. 328,773.

*To all whom it may concern:*

Be it known that I, OTTO H. ESCHHOLZ, a citizen of the United States, and a resident of Wilkinsburg, in the county of Allegheny and State of Pennsylvania, have invented a new and useful Improvement in Electric-Arc-Welding Systems, of which the following is a specification.

My invention relates to arc welding systems, and, more particularly, to alternating-current arc welding systems, and it has, for its primary object, the provision of alternating-current welding systems which shall possess good starting and operating characteristics.

It has been found that alternating-current arc welding systems possess certain desirable features which, however, are offset, to a certain extent, by certain disadvantages, such as the difficulty experienced in establishing an arc by means of alternating current, which difficulty is believed to exist on account of the reversals of current. I have found that the starting characteristics of an alternating-current system may be materially improved by employing a relatively high voltage, either during the period of establishing an arc or under all operating conditions. However, the employment of a sufficiently high voltage to improve the operating characteristics of the system introduces a shock hazard to the operator which is, of course, undesirable.

One object of my invention, therefore, resides in the provision of alternating-current welding systems in which a relatively high operating voltage may be employed and in which means is embodied for insuring a relatively low open-circuit voltage to protect the operator when the system is not in operation.

Another object of my invention resides in the provision of alternating-current welding systems in which a relatively high operating voltage may be employed and in which means is provided, for establishing a relatively low open-circuit voltage, which is inexpensive and light in weight and which does not materially complicate the complete system.

With these and other objects in view, my invention will be more fully described hereinafter and illustrated in the drawing, which is a diagram of a welding system embodying my invention.

I may provide a welding system by employing a transformer having primary and secondary windings, the secondary winding of which may be directly connected to a plurality of electrodes. The primary winding may be connected to a suitable alternating-current supply circuit and I prefer to employ a reactance, connected in series with the primary winding, which is adapted to be shunted from the primary circuit by a switch actuated by a coil connected in parallel relation to the electrodes.

In the drawing is shown a transformer having a primary winding 1 and a secondary winding 2 which is connected to a plurality of electrodes 3. The primary winding 1 is adapted to be connected to a suitable alternating-current supply circuit (not shown), and a reactance 4 is connected in series with the primary winding 1 and is adapted to be shunted by contact members 5 of a switch 6, the contact members 5 being connected in parallel relation to the reactance 4. A spring 7 is connected to the lever arm 8 of the switch 6 which tends, therefore, to always maintain the contacts 5 in engagement. The lever arm 8 is preferably pivoted at one end, as indicated at 9. A coil 10 is connected in parallel relation to the electrodes 3 and is adapted to actuate a core member 11 which is secured to the lever arm 8 of the switch 6.

In operating the above described welding system, the primary winding 1 is, of course, connected to a suitable source of alternating current. When the primary winding 1, and, therefore, the secondary winding 2, is energized, the coil 10 has a relatively high voltage impressed upon it and it actuates the core member 11 to cause a separation of the contact members 5, thus inserting the reactance 4 in series with the primary winding 1. The reactance 4 may be of such value as to limit the voltage across the secondary winding to a suitable value to protect the operator against shocks. The coil 10 is preferably so proportioned as to raise the lever arm 8, against the action of the spring 7, when approximately 40 volts, or higher are impressed upon it. It will be appreciated, that, when the electrodes 3 are engaged, the voltage impressed upon the coil 10 is very low, thus permitting the spring 7 to close the contacts 5 and to shunt the reactance 4 from the primary circuit. Full voltage is then available between the electrodes, and an arc may be readily drawn, in the usual manner, by slowly separating the electrodes.

Under ordinary welding conditions, the voltage drop between the electrodes, occasioned by the length of the arc, seldom exceeds 40 volts, and the coil 10 is preferably designed to require a higher voltage than is ordinarily established across the arc, under welding conditions, to separate the contacts 5 against the action of the spring 7. The mechanism, therefore, for reducing the operating voltage, will not interfere with welding conditions by establishing a low voltage across the secondary winding.

If, for any reason the arc is broken, and open-circuit conditions are established, the coil 10 is immediately so energized as to actuate the core member 11 and the lever arm 8 to open the contacts 5 against the action of the spring 7 and to immediately establish a low voltage across the secondary winding by inserting the reactance 4 in series with the primary winding 1.

It will be appreciated, from the foregoing description, that a simple alternating-current welding system is provided by my invention, in which good operating characteristics are obtained, with an added advantage of affording positive protection to the operator against shock hazards. Since one of the main advantages of an alternating-current welding system is its simplicity and portability, the equipment, added to an ordinary welding system by my invention, is desirable because it does not complicate the system or materially add to its bulk or weight. Furthermore, the additional apparatus, which insures a low open-circuit voltage, does not require any attention on the part of the operator and, therefore, prevents accidents occasioned by carelessness.

Although I have shown and specifically described a welding system embodying my invention, it is obvious that it is susceptible of minor changes without departing from the spirit or scope of my invention, and I desire, therefore, that no limitations shall be imposed except such as are indicated in the appended claims.

I claim as my invention:—

1. An arc welding system comprising a transformer having primary and secondary winding, a plurality of electrodes connected to the secondary winding, an impedance connected in series with the primary winding, and means for shunting the impedance from the primary circuit when current flows in the secondary windings, said means including a switch connected in parallel relation to the impedance and a switch-actuating coil connected in parallel relation to the secondary winding.

2. An arc welding system comprising a transformer having primary and secondary windings, a plurality of electrodes connected to the secondary winding, an impedance connected in series with the primary winding, means always tending to shunt the impedance from the primary circuit and means for maintaining the impedance in the primary circuit.

3. An arc welding system comprising a transformer having primary and secondary windings, a plurality of electrodes connected to the secondary winding, an impedance connected in series with the primary winding, means always tending to shut the impedance from the primary circuit and arc-voltage-controlled means for maintaining the impedance in the primary circuit.

4. An arc welding system comprising a transformer having primary and secondary windings, a plurality of electrodes connected to the secondary winding, an impedance connected in series with the primary winding, a switch adapted to shunt the impedance from the primary circuit, means always tending to close the switch and means for opening it.

5. An arc welding system comprising a transformer having primary and secondary windings, a plurality of electrodes connected to the secondary winding, an impedance connected in series with the primary winding, a switch adapted to shunt the impedance from the primary circuit, a resilient member always tending to close the switch and means for opening it.

6. An arc welding system comprising a transformer having primary and secondary windings, a plurality of electrodes connected to the secondary winding, an impedance connected in series with the primary winding, a switch adapted to shunt the impedance from the primary circuit, a resilient member always tending to close the switch and arc-voltage-controlled means for opening it.

7. An arc welding system comprising a transformer having primary and secondary winding, a plurality of electrodes connected to the secondary winding, an impedance connected in series with the primary winding, a switch adapted to shunt the impedance from the primary circuit, a resilient member always tending to close the switch and a switch-actuating coil connected in parallel relation to the electrodes for opening it.

In testimony whereof I have hereunto subscribed my name this 30th day of Sept., 1919.

OTTO H. ESCHHOLZ.